Patented July 24, 1928.

UNITED STATES PATENT OFFICE.

1,678,024

CHARLES O. TERWILLIGER, OF MOUNT VERNON, NEW YORK, ASSIGNOR TO FRITZ V. BRIESEN, TRUSTEE, OF NEW YORK, N. Y.

CONDENSATION PRODUCT AND METHOD OF MAKING THE SAME.

No Drawing. Application filed October 17, 1924. Serial No. 744,283.

This invention relates to resins, more particularly to condensation products of urea and formaldehyde, or the like.

It has been well known for some time that urea and similar bodies react with formaldehyde and the like to form resinous materials which may be utilized in molding or casting as is common with resinous materials of synthetic origin. Several processes for the production of condensation products by acting on urea with formaldehyde under various conditions have been proposed. Although some of the said processes have been successful in the production of a resin which has desirable properties for commercial applications, I have found that practically all of these resins possess the disadvantage of absorbing water in relatively large quantities in a comparatively short time, in many cases causing the resin first to lose its transparency and finish and then to crack and crumble.

Again, it has been considered necessary by other investigators in making resins of urea and formaldehyde to use a considerable excess of formaldehyde, most of which was lost in the process. For instance, in one of the proposed processes the ratio of urea to 40% by weight formaldehyde solution was 1 to 5 or even greater, whereas I have heretofore found that a ratio of 1 to 2.5 is ample to combine with all the urea. As a result, a large part of the formaldehyde was lost in the process, thus materially increasing the cost of the resin.

This invention is intended and adapted to obviate the disadvantages above enumerated, it being among the objects thereof to provide a method of making resins of the urea type in which the tendency to absorb water is very materially decreased, and in which the loss of formaldehyde is greatly reduced.

I have discovered that if I add to the reaction mixture of urea and formaldehyde one or more substances capable of reacting with formaldehyde to form a relatively water resistant product, and the reaction is then carried to completion, the resulting urea resin is materially more resistant to water than if the said substance, or substances, were not added. I generally use for this purpose a phenolic body, such as ordinary phenol, or a substance having similar characteristics, and I use only a small portion thereof in the reaction, but the increased resistance of the resulting resin to water is far greater than that which might be expected to occur by the simple addition of the said body. For instance, by the addition of about 5% of phenol, based on the weight of urea used, the water absorption of the resin is reduced to one-half or less. If the effect of the phenol were due only to the admixture of a phenol resin with a urea resin, and to the higher water resistant properties of the phenol resins alone, the decrease in water absorption would be slight, whereas in practice it is very great, which fact leads me to conclude that there probably takes place a chemical reaction which forms a new urea-phenol resin, the nature of which I am unable to state but which has properties not found in the urea resins hitherto known.

My invention may be applied to the processes heretofore proposed for making urea resins and it does not require that the said processes be changed to any considerable extent. For instance, it may be readily adapted to the method described and claimed in my copending applications, Serial No. 706,135, filed April 12, 1924, and Serial No. 725,350, filed July 11, 1924, for urea resin and process of making the same. The addition of the phenol or other substance may be made at one of the several stages of the process as desired.

The following example is given to illustrate the practice of my invention:

Forty (40) parts by weight of urea and one hundred (100) parts of forty per cent (40%) by weight of formaldehyde solution are placed in a suitable vessel and agitated until the solution of the urea is complete. A sufficient amount of an alkaline substance such as ammonia, sodium hydroxide or calcium hydroxide, preferably the latter, is added to reduce the acidity imparted by the formaldehyde to a point where the mixture will react just acid to litmus indicator. The slightly acid mixture is heated slowly to about 50° C. and then filtered to remove any insoluble matter that may separate out. The filtered solution is transferred to a suitable apparatus fitted with a reflux condenser and gently boiled for about 30 minutes after which the reflux condenser is removed and the solution is evaporated until its boiling point, which is initially about 97° C., reaches about 100–101° C., when about two-thirds of the water has been driven off. Two parts by weight of phenol are now stirred into the hot solution, which is thoroughly mixed and then placed in a drying oven where it is heated first at about 75° C. for from two to three hours, then at 85°-95° C. for from four to five hours, and finally at 110° C. until hard. If dried at too fast a rate a hardened shell may form over the exposed surface of the resin and prevent hardening of the interior of the mass. Fast drying may also cause bubbles to form with consequent injury to the resin.

I have tested the resulting resin for water absorption and found that, after immersion in water for 24-hours, the increase in weight was 2% compared to 9.3% for a pure urea resin. It is apparent therefore that the addition of as little as 5% of phenol based on the weight of urea used decreased the water absorption to between one-fourth and one-fifth. By increasing the amount of phenol in the urea resin, the water absorption may be still further reduced. For instance, by increasing the proportion of phenol to about 10% of the urea, the water absorption may be decreased to approximately 1%.

In accordance with a slight modification of my invention, I take 40 parts of urea, add thereto 4 parts of phenol and 76 parts of 40% by weight formaldehyde and agitate the mixture until the solution of the ingredients is complete. The acidity of the solution is neutralized until it is just acid to litmus and is heated to about 50° C. and filtered. It is refluxed for about 30 minutes and then evaporated until the boiling point reaches 101° C., after which it is placed in the oven to dry. The resulting resin is clear and perfectly transparent.

It will be noted that I have used a ratio of urea to 40% formaldehyde of 1 to 1.9 and obtained a clear resin thereby, whereas it was not possible hitherto to make a clear resin with a ratio less than 1. to 2.5. The addition of about 10% of phenol based on the weight of urea used allowed a saving of about 24% of the minimum amount of formaldehyde previously used and the resulting resin is more water resistant.

My new resins may be immersed in water for several days without absorbing sufficient water to impair their usefulness to any extent, whereas a urea resin prepared without phenol frequently absorbs so much water in the same time as to cause it to disintegrate. Because of the small proportion of phenol used, up to 10%, the transparency and the colorlessness of the resin is retained even if a dark colored, impure phenol is used in the process. Whereas in former processes a large part of the formaldehyde used was lost in the concentration and hardening stages, by my new process this may be, in part at least, avoided since the phenol combines with formaldehyde in the reacting mixture which would otherwise be lost by evaporation.

Although I have described my invention setting forth two specific embodiments thereof, I am not limited to the details thereof. For instance, I have described the addition of phenol to the reaction mixture at the termination of the evaporation. I do this preferably because phenol is volatile in steam and if it were added at one of the earlier stages of the process, some would pass off during the heating, necessitating the use of equipment to recover the same. However, for the purposes herein set forth, the phenol may be added, in part or in whole, at the very beginning of the process, or just prior to, or after, the refluxing operation. The phenol may be replaced by similar aromatic compounds such as a cresol or a xylenol, resorcinol, beta-naphthol or pyrogallic acid; or it may be replaced by other oils obtained from the distillation of coal tar, such as creosote oil, dead oil, or the like, and the proportions thereof may be varied. I may use as little as 1% based on the weight of urea; I have found that 10% gives excellent results, and the amount may be increased to 40%, although the addition of proportions greater than about 10% has a relatively small effect in further reducing the water absorption of the resin. My invention, although specifically described in connection with a procedure devised by me, is also applicable to other methods of making resins of the urea type. In place of urea I may use derivatives thereof, such as thio-urea, guanidine, or the like, and I may substitute for the formaldehyde equivalents thereof, such as paraformaldehyde, hexamethylenetetramin or the like. These and other changes may be made in my invention as will be apparent to those skilled in the art.

What I claim is:

1. A method of making condensation products which comprises providing a solution containing urea, formaldehyde and a phenolic body, in which the ratio of 40% by weight aqueous formaldehyde to urea is less than 2.5 to 1.0, and heating the same to form a condensation product.

2. A method of making condensation products which comprises providing a solution containing urea, formaldehyde and a phenolic body, in which the ratio of 40% by weight aqueous formaldehyde to urea is less than 2.5 to 1.0, the amount of phenolic body being approximately 10% of the weight of urea, and heating the same to form a condensation product.

3. A method of making condensation products which comprises providing a solution containing urea, formaldehyde and a phenolic body, in which the ratio of urea to 40% by weight aqueous formaldehyde is approximately 1 to 1.9, and heating the same to form a condensation product.

4. A condensation product comprising the product of the reaction of urea and formaldehyde in the ratio of 1 to less than 2.5 parts of 40% by weight aqueous formaldehyde and a phenolic body, the said product being clear and transparent.

5. A condensation product comprising the product of the reaction of urea and formaldehyde in the ratio of 1 to about 1.9 parts of 40% by weight aqueous formaldehyde and a phenolic body, the said product being clear and transparent.

In testimony whereof, I have hereunto subscribed my name this second day of October, 1924.

CHARLES O. TERWILLIGER.